United States Patent [19]
Peeples et al.

[11] Patent Number: 5,593,268
[45] Date of Patent: *Jan. 14, 1997

[54] CARGO LOADING SYSTEM

[75] Inventors: Frank K. Peeples, Savannah; David Raith, Statesboro; Charles E. Donnelly, Savannah, all of Ga.

[73] Assignee: East Coast Terminal Assoc. Ltd., Savannah, Ga.

[ * ] Notice: The term of this patent shall not extend beyond the expiration date of Pat. No. 5,348,434.

[21] Appl. No.: 308,697

[22] Filed: Sep. 19, 1994

Related U.S. Application Data

[62] Division of Ser. No. 964,388, Oct. 21, 1992, Pat. No. 5,348,434.

[51] Int. Cl.$^6$ .................................................. B65G 65/30
[52] U.S. Cl. ............................................................ 414/301
[58] Field of Search .................................. 414/195, 299, 414/300, 301, 302; 239/665–6, 668–9, 679, 681, 687

[56] References Cited

U.S. PATENT DOCUMENTS

| | | | |
|---|---|---|---|
| 2,687,892 | 8/1954 | Kinsella | 414/301 |
| 3,064,833 | 11/1962 | Von Ruden | 414/301 |
| 3,880,300 | 4/1975 | Uhl | 414/301 X |
| 4,135,560 | 1/1979 | Eang et al. | 239/666 X |
| 4,342,345 | 8/1982 | Nadin et al. | 239/666 X |
| 4,424,837 | 1/1984 | Farrell | 414/301 X |
| 4,433,707 | 2/1984 | Farnham | 414/301 X |
| 4,564,328 | 1/1986 | Loutaty et al. | 414/301 |

FOREIGN PATENT DOCUMENTS

| | | | |
|---|---|---|---|
| 1809197 | 1/1970 | Germany | 414/302 |
| 2703329 | 8/1978 | Germany | 414/301 |
| 0017026 | 2/1983 | Japan | 414/301 |
| 0162428 | 7/1986 | Japan | 414/302 |
| 9012746 | 11/1990 | WIPO | 414/301 |

OTHER PUBLICATIONS

*Pulp and Paper Manufacture*, vol. 1 "Preperation and Treatment of Wood Pulp" 1950, pp. 334–336.

*Primary Examiner*—James W. Keenan
*Attorney, Agent, or Firm*—James B. Middleton

[57] ABSTRACT

Chip- or plate-like pieces such as wood chips are tightly packed into a ship's hold or other cargo space by directing the material through a pipe to fall by gravity, the pipe guiding the material to rotating paddles. The paddles engage the pieces of material and propel the pieces away from the paddles along a horizontal path. The pieces are spread over a wider area, and are given time to fall flat, so the pieces land in the cargo space oriented for dense packing. The paddles are connected to a center shaft and angle outward to connect to a support ring. Material is dropped into the center of the support ring to be engaged by the paddles as the assembly rotates. Material can be limited to the upper, faster, areas of the paddles by a frustoconical diverter disposed centrally of the paddles. A choke can be used to provide a dense stream of pieces to the paddles; and, the choke may move the stream off center for uneven distribution.

5 Claims, 3 Drawing Sheets

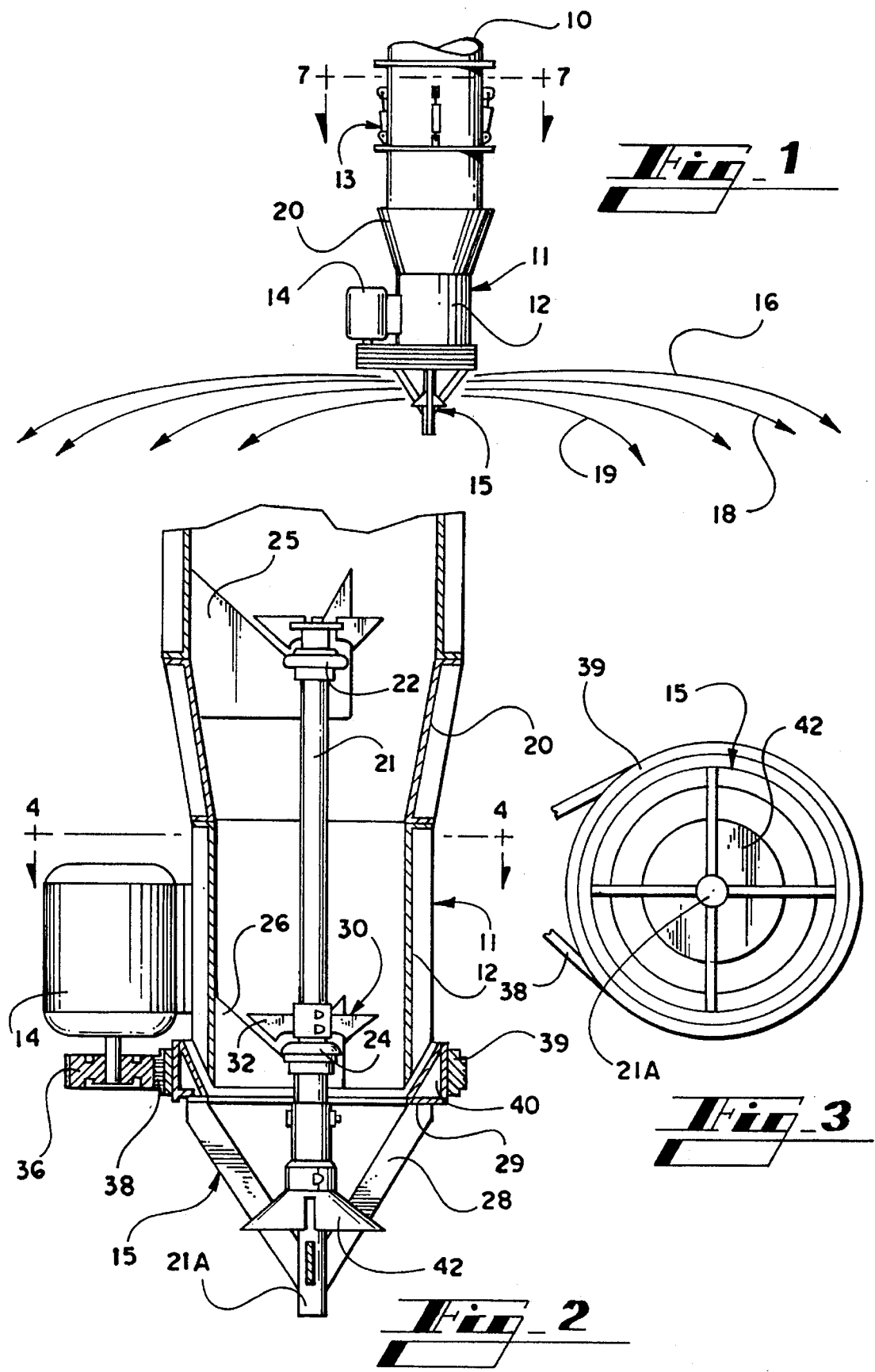

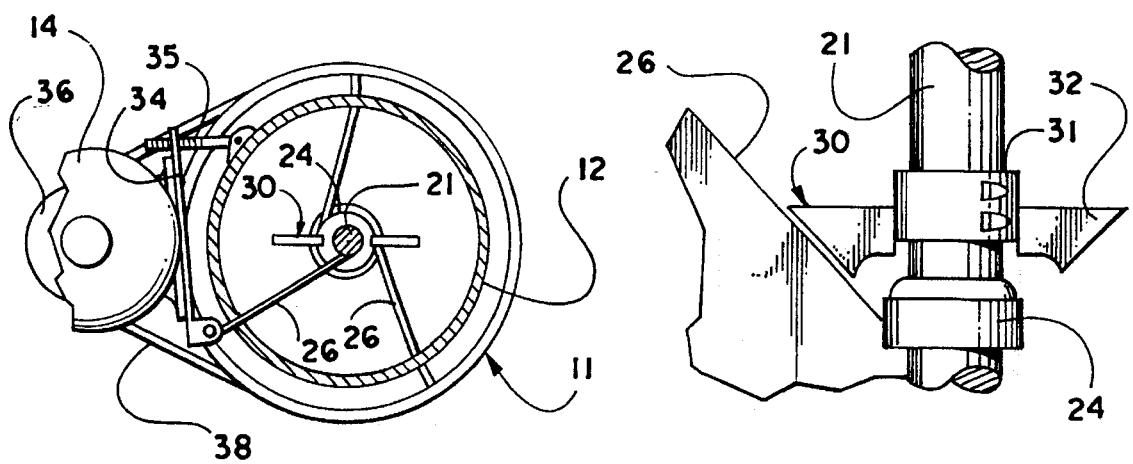
Fig_4    Fig_5
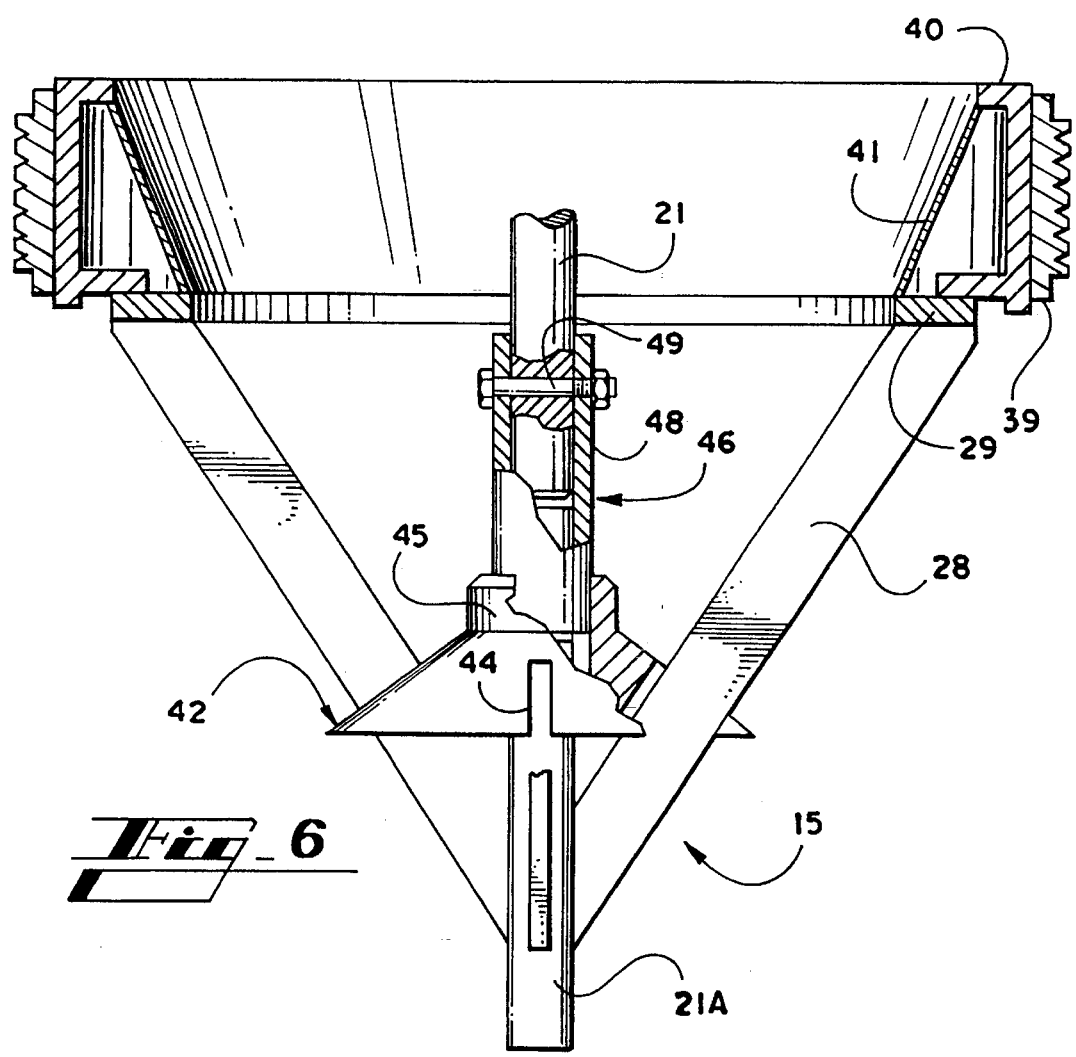
Fig_6

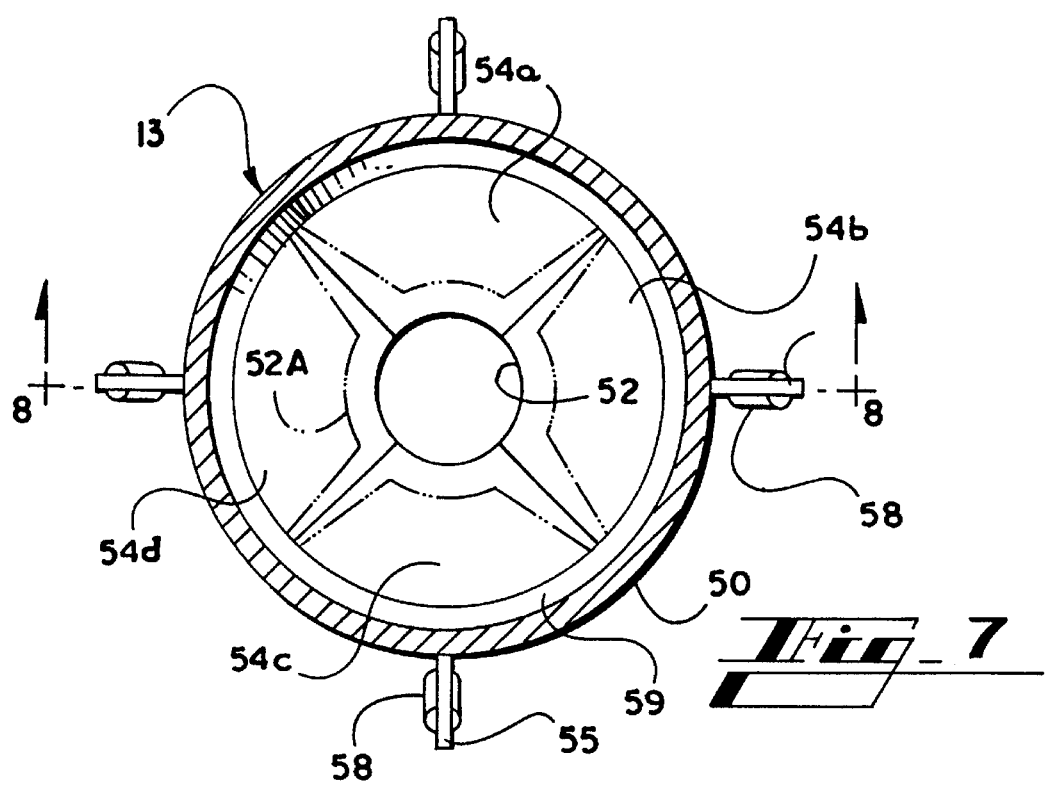
Fig_7
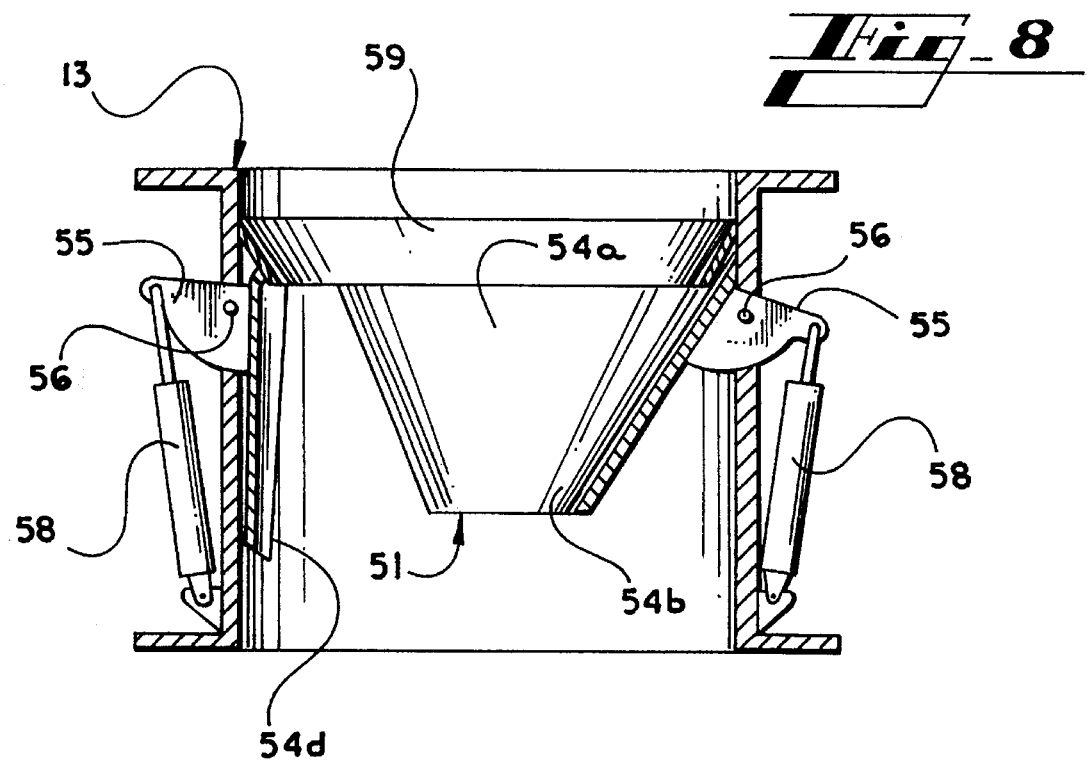
Fig_8

CARGO LOADING SYSTEM

CROSS REFERENCE TO RELATED APPLICATION

This application is a division of the application by the same inventors, filed Oct. 21, 1992, having Ser. No. 07/964,388, now U.S. Pat. No. 5,348,434.

BACKGROUND OF THE INVENTION

1. Field of the Invention

This invention relates generally to the loading of cargo, and is more particularly concerned with a method and apparatus for efficiently loading chip- or plate-like materials into a cargo space.

2. Discussion of the Prior Art

In loading ships, railroad cars, or other shipping means, it is desirable to make maximum use of the cubic space available for greater efficiency in shipping. When dense, or heavy, products are being loaded, it is easy to achieve the maximum weight limit without particular concern for the manner of loading. When light-weight products are to be loaded, however, the product must be packed tightly in order to approach the weight limit.

Some products are relatively easy to pack together. Rectangular boxes, for example, will be stacked tightly, and virtually no space will be wasted. Other products are more difficult to pack tightly. Products such as wood chips are too small to be packed one-by-one, but must be delivered to a space by some form of high speed delivery means. With such a delivery means, wood chips, or other chip- or plate-like materials, will not stack neatly, but will be randomly disposed, leaving large air gaps.

To illustrate the looseness of the packing of chip- or plate-like materials, wood chips weigh about 26 pounds per cubic foot, or 417 kilograms per cubic meter. Ocean going vessels and barges are most often designed to allow 50 cubic feet, or 4.6 cubic meters, per metric ton. Thus, wood chips ought to stow at about 85 cubic feet, or 7.9 cubic meters, per metric ton. Due to the loose packing of wood chips, however, they tend to stow at about 97 to 104 cubic feet, or 9 to 9.7 cubic meters, per metric ton. The extra volume is due to air space caused by the random distribution of the wood chips.

Many efforts have been made to stow wood chips at a lower volume per ton. The chips have been simply dropped into the cargo vessel, then moved around using bulldozers and the like, but this technique does little or nothing to compact the chips. Another technique is to utilize an air conveyor and to blow the chips into all parts of the cargo space. While this may literally fill all portions of the cargo vessel, it does not compact the chips, so the weight per unit volume is not improved. Further, high speed spinners have been used to throw the chips into all areas of the cargo space. Again, this technique may fill the cargo space, but it has not been found to increase the weight per unit volume. Additionally, vibrators have been used in an effort to compact the chips after loading, and these have failed to achieve any great improvement.

SUMMARY OF THE INVENTION

The present invention provides a method wherein chip- or plate-like materials are dumped and allowed to fall by gravity towards the cargo space to be loaded. When the material is within the confines of the cargo space, the material is engaged by propelling means and caused to move away from the inlet and into the cargo space. The pieces of material therefore cover a large area, and there is a time delay in the placing of the pieces. With space and time available, the pieces tend to lie flat and occupy less space than when loaded using prior art techniques.

The apparatus of the present invention utilizes conventional conveyors and the like to deliver material to the area of the cargo space, and also uses the conventional vertical pipe or tube to guide the material as it falls by gravity into the cargo space. At the lower end of the tube, however, there is a choke means to assure that the input is in a condensed stream, and a means for propelling the material outwardly, away from the vertical supply pipe, or inlet. In one embodiment of the invention there is at least one paddle to engage the material and propel the material outwardly. The paddle is rotated by an appropriate drive means, and the material falling from the supply pipe engages the paddle and is propelled outwardly. The paddle slants from the axis of rotation to the perimeter of the supply pipe, so the linear speed of the paddle will vary along its length. Higher linear speeds will propel material further than lower linear speeds, so there will be some distribution of the material.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of an apparatus made in accordance with the present invention, and indicating trajectories of material discharged from the apparatus;

FIG. 2 is an enlarged, diametrical cross-sectional view of the loading apparatus shown in FIG. 1;

FIG. 3 is a bottom plan view of the apparatus shown in FIG. 2 of the drawings, the drive motor being broken away;

FIG. 4 is a cross-sectional view taken generally along the line 4—4 in FIG. 2;

FIG. 5 is a fragmentary view showing a detail of the construction of the apparatus shown in FIGS. 1–4;

FIG. 6 is an enlarged longitudinal cross-sectional view showing the paddle unit illustrated in FIGS. 1–3, FIG. 7 is an enlarged cross-sectional view taken along the line 7—7 in FIG. 1; and, FIG. 8 is a cross-sectional view taken along the line 8—8 in FIG. 7.

DETAILED DESCRIPTION OF THE EMBODIMENT

Referring now more particularly to the drawings, and to that embodiment of the invention here presented by way of illustration, FIG. 1 shows a pipe 10, partially broken away, through which material will be delivered. The distributing and orienting means is generally indicated at 11 and is carried at the end of the pipe 10, while the choke means is in the pipe 10 above the distributing and orienting means 11, and is generally designated at 13.

It should be realized that the present invention can be used with any chip- or plate-like material, which is to say material that is generally flat; and, the invention is usable in loading virtually any cargo space including ships, trucks, railroad cars and the like. By way of example, the following specification will discuss the loading of wood chips into a ship, but this example is not intended to limit the scope of the invention.

Wood chips are typically loaded onto a conveyor, and the conveyor carries the wood chips to the loading area. A crane carries a pipe, such as the pipe 10, at its extending end, the pipe 10 being manipulable for placement of the lower end into a ship's hold. The conveyor delivers the wood chips into the pipe, where the chips fall by gravity into the hold.

The apparatus shown in FIG. 1 includes a portion of the pipe 10, and includes the choke means 13, and the distributing and orienting means 11 of the present invention. The device 11 includes a housing 12 carried by the pipe, 10, with a motor 14 fixed to the side of the housing 12. The motor 14 causes rotation of the propelling means 15, as will be discussed in more detail hereinafter.

As the wood chips fall through the pipe 10, they will enter the choke means and housing 12 and fall freely therethrough. As the chips leave the housing 12, they will be engaged by the propelling means 15 which will impart a lateral motion to the chips. The propelling means 15 is rotating as a unit, and includes sloped material engagement means so that the upper portions will have a higher linear speed, and the chips will receive a lot of energy and be thrown a great distance as indicated by the arrows 16. The middle portions of the engagement means will have a lower linear speed, and will not throw chips as far, as indicated by the arrows 18; and, the lower portion of the engagement means will have a low linear speed, and will not throw chips as far as the middle portion. This is indicated by the arrows 19. The device will be moved around the hold of the ship as appropriate to fill the entire hold.

Attention is now directed to FIG. 2 of the drawings for a detailed description of the construction of the loading apparatus of the present invention, and specifically of the distributing and orienting means 11. The housing 12 is carried by a transition piece 20 which slightly reduces the diameter of the pipe 10. There is an axially mounted shaft 21 supported by bearings 22 and 24. These bearings 22 and 24 are carried by generally radial struts designated at 25 and 26 which will be described in detail hereinafter.

It will be noticed that the housing 12 is fixed to the transition piece 20, which is fixed to the pipe 10; thus, none of this structure is rotatable. On the lower end of the shaft 21, there is the propelling means 15 that is rotatable with respect to the housing 12.

The propelling means 15 includes material engagement means comprising a plurality of paddles 28. The paddles 28 extend from the central shaft 21, up and out to a ring 29. The paddles 28 therefore have their upper ends at a relatively large radius from the shaft 21, and their lower ends at a very small radius from the shaft 21. It will be readily recognized that the upper ends of the paddles will move at a rather high linear speed, while the lower ends of the paddles 28 will move at a rather low linear speed. As a result, when chips are engaged by the upper ends of the paddles 28, significant energy will be imparted to the chips, and such chips will traverse a long trajectory such as the trajectory 16 in FIG. 1. On the other hand, when chips are engaged by the lower ends of the paddles 28, a small amount of energy will be imparted to the chips, and the chips will traverse a short trajectory, for example the trajectory 19 in FIG. 1. As will be discussed in detail hereafter, it may be desirable to limit the contact of the chips to the upper portion of the paddles 28.

As is mentioned above, struts 25 and 26 support the bearings 22 and 24 respectively. The struts 25 and 26 extend from the wall of the housing 12 and are fixed to the bearings 22 and 24. It has been found that, in loading wood chips, strips of the cambium from the trees are mixed in with the wood chips, and these strips of cambium hang over the struts 25 and 26. In time, the cambium so builds up on the struts that the passageway is substantially blocked. The cambium must then be removed before loading of wood chips can continue.

To solve the problem of the cambium or other strips mixed with materials being loaded, it will be noticed that the upper surfaces of the struts 25 and 26 are sloped downwardly, towards the shaft 21. This sloping will cause any strips of cambium or the like to move towards the bearing 22 or 24. Looking at FIG. 5 of the drawings, as the strips approach the bearing 24, the strips will be engaged by a cutter 30.

As here shown, the cutter 30 includes a collar 31 fixed to the shaft 21, and a pair of blades 32 extending from the collar. One edge of the blades 32 is in close proximity to the upper edge of the strut 26, so strips on the strut 26 will be severed as the cutter blade passes by the strut. It will be understood that the blade 32 can be comfortably spaced from the strut 26 because, once the strips build up on the strut sufficiently to cause a problem, the strips will be cut. There is no need to attempt to cut each strip that hangs on the strut. It will also be understood that there is a cutter adjacent to the bearing 22, and the arrangement is like that shown in FIG. 5. The description will therefore not be repeated.

Attention is next directed to the propelling means 15, and to FIGS. 2, 3, 4 and 6 of the drawings. It has been stated generally that the motor 14 drives the propelling means 15. It will be seen that the motor 14 is carried by a platform 34 adjustable by a screw 35. A sheave 36 is carried by the shaft of the motor 14, and V-belts 38 pass around the sheave 36 and around a complementary sheave 39 carried by the propelling means 15. Thus, the screw 35 acts as a belt tightening means for the belts 38.

Looking especially at FIGS. 2 and 6, the propelling means 15 is slightly spaced from the housing 12. The drive member 40 which carries the sheave 39 has an inner, sloping surface 41 adjacent to the lowermost end of the housing 12. Since the drive member 40 will be rotating during use, any chips that engage the surface 41 will be moved up the surface by centrifugal force, and discharged. The space between the surface 41 and the housing 12 will therefore preferably be large enough to allow passage of the chips being loaded with the device.

Turning to FIG. 6 of the drawings, the limiting device 42 is shown in more detail. Part of the object of the present invention is to load a given quantity of chips over a wider area, so one may wish to limit the chips to the upper ends of the paddles 28. For this purpose, the limiting device 42 is frustoconical, and has grooves 44 to receive the paddles 28. A collar 45 integral with the frustoconical device 42 can selectively secure the device to the central member 46. Thus, the limiting means 42 can be moved up or down to direct chips to the paddles 28 and prevent chips from engaging the lower end of the paddles 28.

As here illustrated, the propelling means 15 is exchangeable. The assembly comprising the drive member 40, paddles 28 and central member 46 can be released from the shaft 21, and a different assembly installed thereon.

The central member 46 includes a center shaft 21A having a sleeve 48 fixed to the upper end thereof. Appropriate holes through the sleeve 48 and the shaft 21 allow a bolt 49 to secure the sleeve 48 to the shaft 21. As a result, one must only remove the V-belts 38, remove the bolt 49, and remove the propelling means 15. A different propelling means can be put in place, the bolt 49 replaced, and the V-belts 38 replaced, and the apparatus is again ready for use.

Considering the construction of the propelling means 15, it will be understood that if a stream of material is directed to one side of the apparatus, distribution of material therefrom will be non-uniform. While it may be desirable to have non-uniform distribution is some situations, it will usually be best to have uniform distribution in all directions. To achieve some control over the incoming material, regardless of volume, the choke means 13 is provided. The choke means is best shown in FIGS. 7 and 8 of the drawings.

The choke means 13 is mounted within a housing 50, and includes a frustoconical choke member 51. As shown in FIG. 7, the diameter of the pipe 10, or housing 50, is effectively reduced to the diameter of the central opening 52 in the choke member 51. The choke member is made up of a plurality of choke plates 54a–54d, each of the choke plates being a segment of the frustoconical choke member 51. Further, it will be seen that each of the choke plates is movable individually between the position shown in FIG. 7, and a position generally against the wall of the housing 50, as shown by plate 54d in FIG. 8. These two positions represent the minimum and maximum openings through the choke means 13.

Those skilled in the art will realize that numerous mechanical arrangements may be utilized to pivot the choke plates 54, but one simple arrangement is shown best in FIG. 8. Each choke plate 54 is provided with a pivot plate 55 pivoted at 56 to the housing 50. The pivot plate 55 receives the piston rod of a fluid operated cylinder 58, which has its opposite end fixed to the housing 50. Thus, as the piston rod of the cylinder is projected, the pivot plate 55 will be rotated to cause the choke plate 54 to lie closer to the housing 50. As the piston rod is retracted, the pivot plate 55 will be rotated in the opposite direction to cause the choke plate to move towards the position shown in full lines in FIG. 7.

Those skilled in the art will realize that the upper edges of the choke plates 54 can be shaped to fit the shape of the housing 50 when the plates are closed; but, when the plates are opened the shapes will not match. To prevent material from collecting behind the choke plates 54, there is a collar 59 located to direct all material over the upper edge of the choke plates 54.

With the construction of the choke means in mind, it will be understood that, when a small volume of material is being fed to the distributing means 15, there may be a tendency for the material to be distributed non-uniformly within the pipe 10, leading to non-uniform distribution from the distributing means 15. The choke member 13 may then be adjusted to a narrow opening 52 as shown in full lines in FIG. 7. The stream of material will therefore be concentrated by the choke means. When the volume increases somewhat, all of the choke plates 54 may be moved down to provide a larger opening, as shown in broken lines in FIG. 7, at 52A. As the volume of material further increases, the choke plates 54 may be moved farther, until the maximum opening is provided by placing all the choke plates in the position of the plate 54d in FIG. 8.

To accomplish the above described control, the choke plates could be controlled together as one unit; however, it is contemplated that the controls will be individual to allow additional control of the material stream. By way of example, one might wish to distribute more material on one side of the distributing means 15 than another, perhaps to load material into a corner, or to avoid an area already loaded. For such purposes, the choke blades 54 can be moved to place the opening through the blades off center. This causes material to be directed off the center of the distributing means 15, so the distribution pattern will be non-uniform.

The present invention therefore provides a simple and effective apparatus for loading chip-like material at a higher density than has been possible. The chips fall through the pipe 10 and housing 12 and are engaged by the rotating paddles 28 which distribute the chips into a dense pile.

It is thought that the improvement in stowage is due to the fact that a dense stream of chips is dispersed to cover a large area. In moving radially, the individual chips have free space to be able to lie flat, and have time to, lie flat before being engaged by other chips. Such a theory appears to explain the observed improvement; however, the theory is proffered merely as a possible explanation and is not intended to limit the scope of the invention. In any case, the apparatus of the present invention is easy to use and to maintain, and the easy substitution of propelling means will allow short downtimes due to damage or the like.

One cannot anticipate perfect packing of the chips since they are being simply thrown into place, but tests have shown that an improvement of about 15% to 25% in the stowage factor can be expected. The stowage factor is the volume occupied by one metric ton of cargo; therefore, a 15% to 25% improvement in the stowage factor will result in about 15% to 25% more cargo in one vessel, or vehicle.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

We claim:

1. A method for orienting and distributing pieces of plate-like material in a cargo space, said method including the steps of feeding a plurality of pieces in a stream towards said cargo space by dropping said plurality of pieces so that said pieces fall by gravity towards said cargo space, feeding said stream to a propelling means for propelling said plurality of pieces away from said propelling means by contacting each piece of said plurality of pieces with a paddle having a vertical flat face for engaging of pieces, said paddle being rotated about an axis having an upper end farther away from said axis than the lower end, said step of contacting each piece being carried out while such piece is falling by gravity through said propelling means, thereby dispersing said stream and distributing said pieces over a large area, and allowing each piece of said plurality of pieces to fall generally flat before being covered by additional pieces, wherein said propelling means includes a plurality of said paddles, said upper end rotating about a large radius for providing a high linear speed, and said lower end rotating about a small radius for providing a low linear speed, and including the steps of engaging a first group of said pieces with a portion of said paddles having a high linear speed for propelling said first group of pieces a great distance from said paddles, and engaging a second group of pieces with a portion of said paddles having a lower linear speed for propelling said second group of pieces a smaller distance from said paddles, said second group of pieces being below said first group of pieces.

2. The method as claimed in claim 1, wherein said step of dropping said plurality of pieces comprises the steps of supporting a pipe adjacent to said cargo space with one end of said pipe adjacent to said propelling means, and placing said plurality of pieces into said pipe to fall by gravity through said pipe.

3. The method as claimed in claim 2, and further including the step of moving said pipe and said propelling means about said cargo space for filling said cargo space with said material.

4. Apparatus for orienting and distributing pieces of plate-like material in a cargo space, said apparatus comprising propelling means disposed adjacent to said cargo space, means for feeding a stream of said material to said propelling means, said propelling means constituting means for propelling each piece of said plurality of pieces laterally as such piece falls by gravity through said propelling means so that said propelling means will propel said pieces through the air away from said propelling means in a generally horizontal direction, said means for propelling each piece including at least one paddle rotating about a vertical axis, said paddle having an upper end and a lower end, said upper end being farther away from said axis than said lower end, said paddle further having a flat vertical face as the only surface effectively engaging said pieces so that said pieces are falling vertically downward at the time said pieces are engaged by said flat vertical face of said paddle.

5. Apparatus as claimed in claim 4, said at least one paddle comprising a plurality of paddles disposed about said axis, and means for rotating said plurality of paddles about said axis.

* * * * *